United States Patent
Wang (10) Patent No.: US 10,846,565 B2
(45) Date of Patent: Nov. 24, 2020

(54) APPARATUS, METHOD AND COMPUTER PROGRAM PRODUCT FOR DISTANCE ESTIMATION BETWEEN SAMPLES

(71) Applicant: Nokia Technologies Oy, Espoo (FI)

(72) Inventor: Meng Wang, Nanjing (CN)

(73) Assignee: Nokia Technologies Oy, Espoo (FI)

( * ) Notice: Subject to any disclaimer, the term of this patent is extended or adjusted under 35 U.S.C. 154(b) by 72 days.

(21) Appl. No.: 16/336,787

(22) PCT Filed: Oct. 8, 2016

(86) PCT No.: PCT/CN2016/101453
§ 371 (c)(1),
(2) Date: Mar. 26, 2019

(87) PCT Pub. No.: WO2018/064800
PCT Pub. Date: Apr. 12, 2018

(65) Prior Publication Data
US 2020/0019818 A1 Jan. 16, 2020

(51) Int. Cl.
*G06K 9/62* (2006.01)
*G06K 9/00* (2006.01)
*G01N 15/14* (2006.01)

(52) U.S. Cl.
CPC ........ *G06K 9/6252* (2013.01); *G06K 9/00711* (2013.01); *G06K 9/6215* (2013.01);
(Continued)

(58) Field of Classification Search
None
See application file for complete search history.

(56) References Cited

U.S. PATENT DOCUMENTS

| | | | |
|---|---|---|---|
| 7,302,451 B2 | 11/2007 | Radhakrishnan et al. | |
| 7,336,803 B2 * | 2/2008 | Mittal | G06K 9/00771 348/169 |

(Continued)

FOREIGN PATENT DOCUMENTS

| | | |
|---|---|---|
| CN | 102013095 A | 4/2011 |
| CN | 102663418 A | 9/2012 |
| CN | 103049751 A | 4/2013 |

OTHER PUBLICATIONS

Gao H et al., "Predicting quality variables of fermentation process based on maximum quadratic mutual information criterion regression comprises e.g. offline modeling phase comprises 3-D data expansion and obtaining 2-D matrix", Mar. 6, 2020; Univ Beijing Technology; CN 110866643 A; pp. 1-5 (Year: 2020).*

(Continued)

*Primary Examiner* — Dov Popovici
(74) *Attorney, Agent, or Firm* — Nokia Technologies Oy (57) ABSTRACT

Apparatus, method, computer program product and computer readable medium are disclosed for distance estimation between samples. The method includes: modeling the distribution of each of two feature vector sets by a non-parametric model; and calculating the distance of the two distributions, wherein a kernel function is used in the non-parametric model, the kernel function is optimized based on labeled training data, the first feature vector set includes a plurality of feature vectors extracted from a sample, and the second feature vector set includes a plurality of feature vectors extracted from another sample.

18 Claims, 3 Drawing Sheets

(52) U.S. Cl.
CPC ......... *G06K 9/6242* (2013.01); *G06K 9/6267* (2013.01); *G01N 2015/1477* (2013.01)

(56) References Cited

U.S. PATENT DOCUMENTS

| | | | |
|---|---|---|---|
| 7,853,432 | B2 | 12/2010 | Hero, III et al. |
| 2007/0010998 | A1 | 1/2007 | Radhakrishnan et al. |
| 2010/0250190 | A1* | 9/2010 | Zhang .................. G06F 16/48 702/181 |
| 2011/0235910 | A1 | 9/2011 | Soceanu et al. |
| 2014/0293043 | A1* | 10/2014 | Datta .................. G06T 5/006 348/135 |

OTHER PUBLICATIONS

Guo B et al., "Monitoring wear status of turning tool based on metric learning comprises collecting wear image, preprocessing image, building feature extraction network model and distance metric function, inputting test set and outputting accuracy", Jun. 5, 2020; Univ Yanshan; CN111242202A; pp. 1-4 (Year: 2020).*

Goldberger et al., "Neighbourhood Components Analysis", Advances in Neural Information Processing Systems (NIPS), 2004, 8 pages.

Wang et al., "View-Based Discriminative Probabilistic Modeling for 3D Object Retrieval and Recognition", IEEE Transactions on Image Processing, vol. 22, No. 4, Apr. 2013, pp. 1395-1407.

Goldberger et al., "An Efficient Image Similarity Measure based on Approximations of KL-Divergence between two Gaussian Mixtures", Proceedings Ninth IEEE International Conference on Computer Vision, vol. 2, Oct. 13-16, 2003, 7 pages.

Liu et al., "A Similarity Measure between Unordered Vector Sets with Application to Image Categorization", IEEE Conference on Computer Vision and Pattern Recognition, Jun. 23-28, 2008, 8 pages.

Moreno et al., "A Kull-back-Leibler Divergence Based Kernel for SVM Classification in Multimedia Applications", Advances in Neural Information Processing Systems 16 (NIPS), 2003, 8 pages.

Perronnin et al., "Modeling Images as Mixtures of Reference Images", IEEE Conference on Computer Vision and Pattern Recognition, Jun. 2009, pp. 1770-1777.

Vasconcelos, "On the Efficient Evaluation of Probabilistic Similarity Functions for Image Retrieval", IEEE Transactions on Information Theory, vol. 50, No. 7, Jul. 2004, pp. 1482-1496.

Vasconcelos et al., "The Kullback-Leibler Kernel as a Framework for Discriminant and Localized Representations for Visual Recognition", European Conference on Computer Vision, 2004, 12 pages.

Gao et al., "3-D Object Retrieval with Hausdorff Distance Learning", IEEE Transactions on Industrial Electronics, vol. 61, No. 4, Apr. 2014, pp. 2088-2098.

Yang et al., "Distance Metric Learning: A Comprehensive Survey", Michigan State Universiy, May 19, 2006, pp. 1-51.

He et al., "Kernel Density Metric Learning", IEEE 13th International Conference on Data Mining, Dec. 2013, 10 pages.

Elgammal et al., "Probabilistic Tracking in Joint Feature-Spatial Spaces", IEEE Computer Society Conference on Computer Vision and Pattern Recognition, Jun. 18-20, 2003, pp. 1-8.

Yang et al., "Similarity Measure for Nonparametric Kernel Density Based Object Tracking", 18th Annual Conference on Neural Information Processing Systems (NIPS), 2004, 8 pages.

International Search Report and Written Opinion received for corresponding Patent Cooperation Treaty Application No. PCT/CN2016/101453, dated Jun. 28, 2017, 11 pages.

* cited by examiner

┌─────────────────────────────────────┐
| Modeling the distribution of each of two | 201
| feature vector sets by a non-parametric |
| model |
└─────────────────────────────────────┘
                  │
                  ▼
┌─────────────────────────────────────┐
| Calculating the distance of the two | 203
| distributions, wherein a kernel function |
| is used in the non-parametric model, the |
| kernel function is optimized based on |
| labeled training data, the first feature |
| vector set comprises a plurality of |
| feature vectors extracted from a sample, |
| and the second feature vector set |
| comprises a plurality of feature vectors |
| extracted from another sample |
└─────────────────────────────────────┘

APPARATUS, METHOD AND COMPUTER PROGRAM PRODUCT FOR DISTANCE ESTIMATION BETWEEN SAMPLES

RELATED APPLICATION

This application was originally filed as PCT Application No. PCT/CN2016/101453 filed Oct. 8, 2016.

FIELD OF THE INVENTION

Embodiments of the disclosure generally relate to information technologies, and, more particularly, to distance estimation between samples.

BACKGROUND

Distance estimation is important to many applications, such as computer vision applications, for example image/video recognition, classification, retrieval and recommendation, etc. For instance, in the K-nearest-neighbor (KNN) classifier, the key is to identify the set of labeled images that are closest to a given test image in the space of visual features, which involves the estimation of a distance metric between two images. Therefore, distance estimation is necessary in many applications.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

According to one aspect of the disclosure, it is provided an apparatus. The apparatus may comprise at least one processor; and at least one memory including computer program code, the memory and the computer program code configured to, working with the at least one processor, cause the apparatus to perform at least the following: model the distribution of each of two feature vector sets by a non-parametric model; and calculate the distance of the two distributions, wherein a kernel function is used in the non-parametric model, the kernel function is optimized based on labeled training data, the first feature vector set comprises a plurality of feature vectors extracted from a sample, and the second feature vector set comprises a plurality of feature vectors extracted from another sample.

In an embodiment, the non-parametric model comprises kernel density estimation.

In an embodiment, the kernel function comprises one of multivariate Gaussian kernel function, polynomial spline kernel function or exponential kernel function.

In an embodiment, the multivariate gaussian kernel function is used as the kernel function, and a transformation matrix is used in the multivariate gaussian kernel function and is optimized based on the labeled training data by modified neighborhood component analysis.

In an embodiment, the distance comprises Kullback-Leibler divergence or Probability Product Kernel.

In an embodiment, the distance is the Kullback-Leibler divergence, and the Kullback-Leibler divergence is approximated based on the strong law of large numbers.

According to another aspect of the disclosure, it is provided a method comprising: modeling the distribution of each of two feature vector sets by a non-parametric model; and calculating the distance of the two distributions, wherein a kernel function is used in the non-parametric model, the kernel function is optimized based on labeled training data, the first feature vector set comprises a plurality of feature vectors extracted from a sample, and the second feature vector set comprises a plurality of feature vectors extracted from another sample.

In an embodiment, the non-parametric model comprises kernel density estimation.

In an embodiment, the kernel function comprises one of multivariate Gaussian kernel function, polynomial spline kernel function or exponential kernel function.

In an embodiment, the multivariate gaussian kernel function is used as the kernel function, and a transformation matrix is used in the multivariate gaussian kernel function and is optimized based on the labeled training data by modified neighborhood component analysis.

In an embodiment, the distance comprises Kullback-Leibler divergence or Probability Product Kernel.

In an embodiment, the distance is the Kullback-Leibler divergence, and the Kullback-Leibler divergence is approximated based on the strong law of large numbers.

According to still another aspect of the disclosure, it is provided an apparatus comprising means configured to model the distribution of each of two feature vector sets by a non-parametric model; and means configured to calculate the distance of the two distributions, wherein a kernel function is used in the non-parametric model, the kernel function is optimized based on labeled training data, the first feature vector set comprises a plurality of feature vectors extracted from a sample, and the second feature vector set comprises a plurality of feature vectors extracted from another sample.

According to still another aspect of the disclosure, it is provided a computer program product embodied on a distribution medium readable by a computer and comprising program instructions which, when loaded into a computer, execute the following: model the distribution of each of two feature vector sets by a non-parametric model; and calculate the distance of the two distributions, wherein a kernel function is used in the non-parametric model, the kernel function is optimized based on labeled training data, the first feature vector set comprises a plurality of feature vectors extracted from a sample, and the second feature vector set comprises a plurality of feature vectors extracted from another sample.

According to still another aspect of the disclosure, it is provided a non-transitory computer readable medium having encoded thereon statements and instructions to cause a processor to execute the following: model the distribution of each of two feature vector sets by a non-parametric model; and calculate the distance of the two distributions, wherein a kernel function is used in the non-parametric model, the kernel function is optimized based on labeled training data, the first feature vector set comprises a plurality of feature vectors extracted from a sample, and the second feature vector set comprises a plurality of feature vectors extracted from another sample.

These and other objects, features and advantages of the disclosure will become apparent from the following detailed description of illustrative embodiments thereof, which is to be read in connection with the accompanying drawings.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement. Various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network apparatus, other network apparatus, and/or other computing apparatus.

As defined herein, a "non-transitory computer-readable medium," which refers to a physical medium (e.g., volatile or non-volatile memory device), can be differentiated from a "transitory computer-readable medium," which refers to an electromagnetic signal.

It is noted that though the embodiments are mainly described in the context of distance estimation between images, they are not limited to this but can be applied to distance estimation between any suitable samples, such as videos, three dimensional (3D) objects, etc., or their combination.

As mentioned above, learning a good distance metric in feature space is crucial in many applications. For example, good distance metrics are important to many computer vision tasks, such as image classification and content-based image retrieval. As an example, the retrieval quality of content-based image retrieval (CBIR) systems is known to be highly dependent on the criterion used to define similarity between images and has motivated significant research in learning good distance metrics.

In several scenarios, a sample such as image may not be represented by a feature vector, and instead, it is represented by a set of feature vectors. For example, we can extract a set of local features from an image, and thus an image is represented as a set of feature vectors. A visual feature vector can also be extracted from each video frame and thus a video may be represented as a set of feature vectors. For 3D objects, we can extract a feature vector from each object view, and thus an object may be represented as a set of view feature vectors. Therefore, the problem becomes estimating the distance of feature vector sets.

There are existing approaches that are able to estimate the distance of feature vector sets, such as a probabilistic model which can estimate the distance of two probabilistic models. Another approach is to model the SIFT (scale-invariant feature transform) feature vectors within a video clip with a GMM and then perform event recognition based on the KL divergence of the GMMs. However, these probabilistic models may not well fit the distribution of feature vectors in a set. In addition, how to estimate the parameters of the model is also a problem. It frequently happens that the feature vectors in a sample are not sufficient to train a good parametric model. In addition, the distance measurements built on the models do not have strong discriminative ability.

To mitigate or overcome at least one of the problems above, embodiments of the disclosure propose a method that is based on a non-parametric model and can explore labeled training data, which can achieve better performance than conventional approaches.

Figure 1:
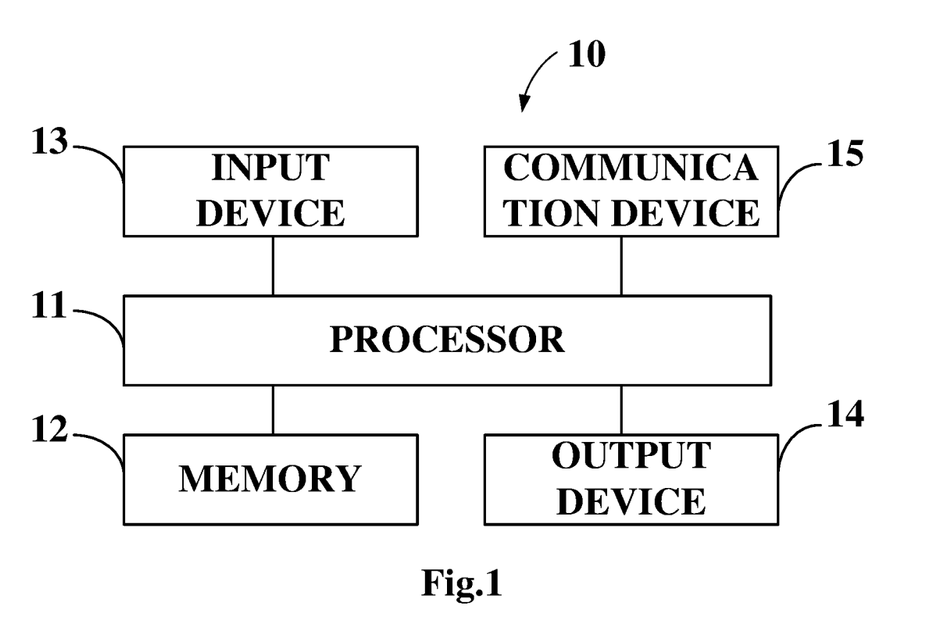
FIG. 1 is a simplified block diagram showing an apparatus, in which various embodiments of the disclosure may be applied, according to embodiments of the present disclosure.

FIG. 1 is a simplified block diagram showing an apparatus, such as an electronic apparatus 10, in which various embodiments of the disclosure may be applied. It should be understood, however, that the electronic apparatus as illustrated and hereinafter described is merely illustrative of an apparatus that could benefit from embodiments of the disclosure and, therefore, should not be taken to limit the scope of the disclosure. While the electronic apparatus 10 is illustrated and will be hereinafter described for purposes of example, other types of apparatuses may readily employ embodiments of the disclosure. The electronic apparatus 10 may be a portable digital assistant (PDAs), a user equipment, a mobile computer, a desktop computer, a server, a cloud computer, a smart television, a gaming apparatus, a laptop computer, a media player, a camera, a video recorder, a mobile phone, a global positioning system (GPS) apparatus, a smart phone, a tablet, a server, a thin client, a cloud computer, a virtual server, a set-top box, a computing device, a distributed system, a smart glass, a vehicle navigation system, a vehicle infotainment system, any other type of electronic system, or any combination thereof. The electronic apparatus 10 may run with any kind of operating system including, but not limited to, Windows, Linux, UNIX, Android, iOS and their variants. Moreover, the apparatus of at least one example embodiment need not to be the entire electronic apparatus, but may be a component or group of components of the electronic apparatus in other example embodiments.

In at least one example embodiment, the electronic apparatus 10 may comprise processor 11 and memory 12. Processor 11 may be any type of processor, controller, embedded controller, processor core, and/or the like. In at least one example embodiment, processor 11 utilizes computer program code to cause the electronic apparatus 10 to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication element 15. In at least one example embodiment, communication element 15 comprises an antenna (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication element 15 may operate with one or more air interface standards, communication protocols, modulation types, and access types. By way of illustration, the electronic communication element 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication element 15 may operate in accordance with wireline protocols, such as Ethernet, digital subscriber line (DSL), and/or the like.

Processor 11 may comprise means, such as circuitry, for implementing audio, video, communication, navigation, logic functions, and/or the like, as well as for implementing embodiments of the disclosure including, for example, one or more of the functions described herein. For example, processor 11 may comprise means, such as a digital signal processor device, a microprocessor device, various analog to digital converters, digital to analog converters, processing circuitry and other support circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 11 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output Device 14 may comprise a visual output device, such as a display, a light, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, a removable storage device and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

Figure 2:
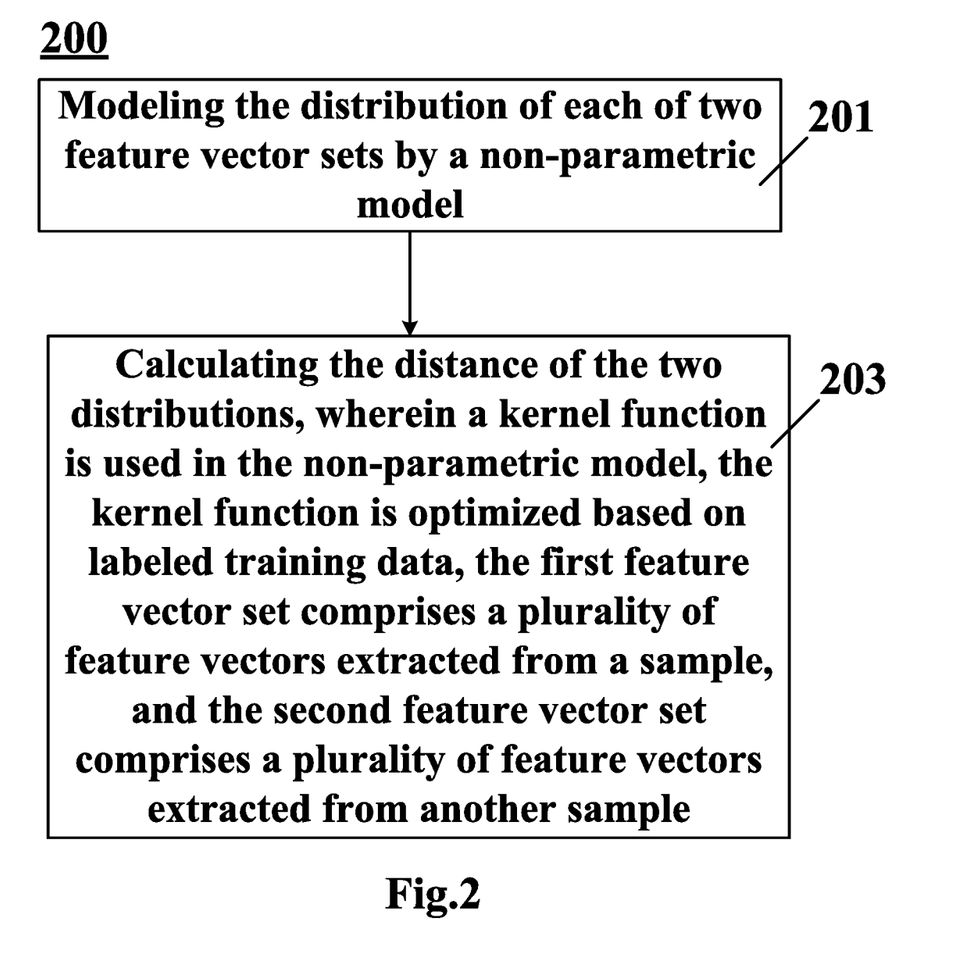
FIG. 2 is a flow chart depicting a process of distance estimation according to embodiments of the present disclosure.

FIG. 2 is a flow chart depicting a process 200 of distance estimation according to embodiments of the present disclosure, which may be performed at an apparatus such as the electronic apparatus 10 of FIG. 1. As such, the electronic apparatus 10 may provide means for accomplishing various parts of the process 200 as well as means for accomplishing other processes in conjunction with other components.

As shown in FIG. 2, the process 200 may start at block 201 where the electronic apparatus 10 may model the distribution of each of two feature vector sets by a non-parametric model. The first feature vector set may comprise a plurality of feature vectors extracted from a sample, the second feature vector set may comprise a plurality of feature vectors extracted from another sample. The sample can be image, video, 3D-object, or any other suitable samples. For example, a set of local features may be extracted from an image, and thus an image may be represented as a set of feature vectors. A visual feature vector may be extracted from each video frame and thus a video may be represented as a set of feature vectors. For 3D objects, supposing there are a plurality of object views each containing a 3D object, we can extract a feature vector from each of the plurality of object views, and thus the 3D object may be represented as a set of feature vectors.

In addition, any suitable feature extraction algorithm can be used in feature extraction depending on applications. For example, if the plurality of feature vectors are extracted from an image and the feature dimension is high, then the feature extraction may be performed by using for example principal component analysis (PCA) where high quality discriminant features can be obtained.

In addition, the two feature vector sets may be pre-stored in a memory of the electronic apparatus 10, computed in real time by the electronic apparatus 10, or retrieved from a network location or a local location. By way of example, referring to FIG. 1, the processor 11 may obtain the two feature vector sets from the memory 12 if they have been stored in the memory 12; obtain the two feature vector sets from the input device 13 such as from a removable storage device which has stored the two feature vector sets; or obtain the two feature vector sets from a network location by means of the communication element 15.

The non-parametric model can be any suitable non-parametric model in which a kernel function is used. In an embodiment, the non-parametric model may be kernel density estimation (KDE) which may estimate the probability density function of a set of feature vectors $X=\{x_1, x_2, \ldots, x_m\}$ as $$p_X(x) = \frac{1}{m} \sum_{i=1}^{m} K(x, x_i) \tag{1}$$

where $p_x(x)$ denotes the probability density function, m denotes the number of feature vectors in the set of feature vectors X, and $K(x, x_i)$ denotes the kernel function.

In this embodiment, the kernel function can be any suitable kernel function, such as multivariate Gaussian kernel function, polynomial spline kernel function or exponential kernel function.

In an embodiment, the multivariate gaussian kernel function is used as the kernel function, and a transformation matrix is used in the multivariate gaussian kernel function and is optimized based on the labeled training data by a method that is similar to neighborhood component analysis (NCA), which is referred to as modified neighborhood component analysis herein.

For example, the multivariate Gaussian kernel function can be written as $$K(x, y) = \frac{|M|^{1/2}}{(2\pi)^{k/2}} \exp\left(-\frac{1}{2}(x-y)^T M(x-y)\right) = \tag{2}$$

$$\frac{|A|}{(2\pi)^{\frac{k}{2}}} \exp\left(-\frac{1}{2}(x-y)^T A^T A (x-y)\right)$$

where M is the covariance matrix of the multivariate Gaussian kernel function, x and y denote two feature vectors, k denotes the dimension of the feature vectors. Since M is a positive semidefinite matrix, it can be decomposed into $A^T A$ wherein A is a transformation matrix.

Then, the transformation matrix A can be optimized based on labeled training data by the modified neighborhood component analysis, which optimizes the transformation matrix A with a gradient descent approach. The objective can be written as $$\text{maximize } f(A) = \sum_{i} \sum_{j \in C_i} p_{ij} = \sum_{i} \sum_{j \in C_i} \frac{\exp(-\|D(X_i, X_j)\|)}{\sum_{k \neq i} \exp(-\|D(X_i, X_k)\|)} \tag{3}$$

where $C_i$ denotes the set of feature vectors in the same class as $X_i$. The above formulation can also be solved with a gradient descent process.

The derivation of the gradient descent of f(A) with respect to A is as follows. The idea provided by J. Goldberger, S. Roweis, G. Hinton, and R. Salakhutdinov, "*Neighbourhood component analysis*", NIPS 2004 can be used to optimize the leave-one-out (LOO) performance, which is incorporated herein by reference in its entirety. The classification error rate of k-NN classifier can be considered. Note that its real classification error rate is a discontinuous function of the transformation matrix A, since a continuous change of A may change the neighborhood of samples and thus bring a discontinuous change to the leave-one-out classification error rate. The approach provided by the above reference can be used to define a differentiate cost function based on stochastic neighborhood assignments in the transformed space. To maximize the expected number of feature vectors correctly classified (the probability $p_i$ that feature vector i will be correctly classified, i.e., $p_i = \Sigma_{j \in C_i} p_{ij}$), we have an objective as:

$$\text{maximize } f(A) = \sum_{i} \sum_{j \in C_i} p_{ij} = \sum_{i} \sum_{j \in C_i} \frac{\exp(-\|D(X_i, X_j)\|)}{\sum_{k \neq i} \exp(-\|D(X_i, X_k)\|)} \tag{4}$$

where subscripts i, j, k denote the indices of samples, r, s, t denote the indices of descriptors, and $n_i$, $n_j$, $n_k$ denote the number of descriptors in samples i, j, k, respectively.

Then, we have $$\frac{\partial f}{\partial A} = \sum_{i} \sum_{j} p_{ij} \left[ \frac{\partial(-D(X_i, X_j))}{\partial A} - \sum_{k \neq i} p_{ik} \frac{\partial(-D(X_i, X_k))}{\partial A} \right] = \tag{5}$$

$$A \sum_{i} \sum_{j \in C_i} p_{ij} (g_{ij} + g_{ji}) - \sum_{k \neq i} p_{ik}(g_{ik} + g_{ki})$$

Or, it can be written as $$\frac{\partial f}{\partial A} = A \sum_i \left( \sum_{j \in C_i} p_{ij}(g_{ij} + g_{ji}) - \left( p_i \sum_{k \neq i} p_{ik}(g_{ik} + g_{ki}) \right) \right) \quad (6)$$

where $$g_{ij} = \frac{1}{2n_i} \sum_{r=1}^{n_i} \left[ \left( \sum_{t=1}^{n_j} \frac{h_{ir,jt}}{ir, i} \right) \times \sum_{s=1}^{n_i} \left( \frac{h_{ir,is}}{ir, j} \left( x_{ir,is} x_{ir,is}^T - \sum_{t=1}^{n_b} \frac{h_{ir,jt}}{ir, j} \times x_{ir,jt} x_{ir,jt}^T \right) \right) \right]$$

is a measurement between samples i and j (based on their descriptor set), where $$x_{ir,jt} = x_{ir} - x_{jt},$$

$$h_{\substack{ir,is \\ ir,j}} = \frac{\exp\left(-\frac{1}{2}(x_{ir} - x_{is})^T A^T A (x_{ir} - x_{is})\right)}{\sum_{t=1}^{n_j} \exp\left(-\frac{1}{2}(x_{ir} - x_{jt})^T A^T A (x_{ir} - x_{jt})\right)} = \frac{K(x_{ir}, x_{is})}{\sum_{t=1}^{n_j} K(x_{ir}, x_{jt})}.$$

Turn to FIG. 2, after modeling the distribution of each of two feature vector sets by a non-parametric model at block 201, the electronic apparatus 10 may calculate the distance of the two distributions at block 203. The electronic apparatus 10 may calculate the distance of the two distributions based on any suitable approach.

In an embodiment, the distance may comprise Kullback-Leibler divergence or Probability Product Kernel. In this embodiment, the electronic apparatus 10 may calculate the Kullback-Leibler divergence or Probability Product Kernel of the two distributions. If the distance is represented by any other measure, the electronic apparatus 10 may calculate any other suitable distance in other embodiments.

In an embodiment, the distance is the Kullback-Leibler divergence. The KL divergence of the distributions of two samples $X_1$ and $X_2$ can be estimated as $$D(X_1, X_2) = 0.5 \int p_{X1}(x) \log \frac{p_{X1}(x)}{p_{X2}(x)} dx + 0.5 \int p_{X2}(x) \log \frac{p_{X2}(x)}{p_{X1}(x)} dx \quad (7)$$

where $p_{X1}(x)$ and $p_{X2}(x)$ are the probability density functions of the two samples $X_1$ and $X_2$ respectively, wherein each sample is represented as a set of feature vectors $X = \{x_1, x_2, \ldots, x_m\}$.

The above divergence cannot be directly computed. In an embodiment, based on the strong law of large numbers, the above divergence can be approximated as $$D(X_1, X_2) = \frac{1}{2m} \sum_{k=1}^{m} \log \frac{\sum_{i=1}^{m} K(x_{1k}, x_{1i})}{\sum_{i=1}^{n} K(x_{1k}, x_{2i})} + \frac{1}{2n} \sum_{k=1}^{n} \log \frac{\sum_{i=1}^{n} K(x_{2k}, x_{2i})}{\sum_{i=1}^{m} K(x_{2k}, x_{1i})} \quad (8)$$

Note that here the Kullback-Leibler divergence between two feature vector sets $X_1 = \{x_{11}, x_{12}, x_{13}, \ldots, x_{1m}\}$ and $X_2 = \{x_{21}, x_{22}, x_{23}, \ldots, x_{2n}\}$ are estimated. For example, based on the estimated distance, different machine learning algorithms can be employed to accomplish image/video recognition, classification, retrieval and recommendation, etc.

Figure 3:
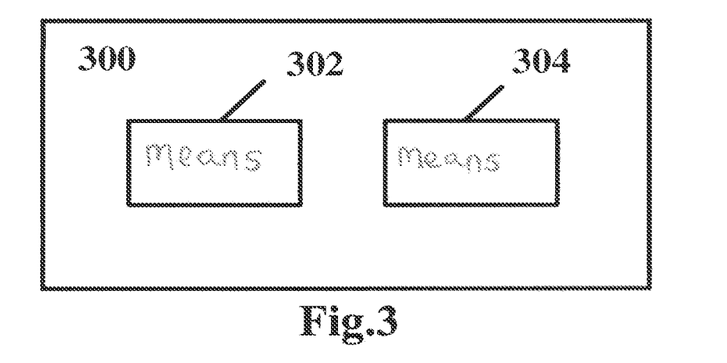
FIG. 3 illustrates a simplified block diagram of an apparatus according to embodiments of the present disclosure.

Under the same inventive concept, FIG. 3 illustrates a simplified block diagram of the apparatus 300 which is suitable for using in practicing the exemplary embodiments of the present disclosure. The apparatus 300 may be or included in the electronic apparatus 10 as shown in FIG. 1. The apparatus 300 may perform corresponding operations as described with respect to FIG. 2. For same parts or functions as described in the previous embodiments, the description thereof is omitted for brevity.

As shown in FIG. 3, the apparatus 300 may comprise means 302, for example at least one processor connected to at least one memory including computer program code, configured to model the distribution of each of two feature vector sets by a non-parametric model; and means 304, for example at least one processor connected to at least one memory including computer program code, configured to calculate the distance of the two distributions, wherein a kernel function is used in the non-parametric model, the kernel function is optimized based on labeled training data, the first feature vector set comprises a plurality of feature vectors extracted from a sample, and the second feature vector set comprises a plurality of feature vectors extracted from another sample.

In an embodiment, the non-parametric model may comprise kernel density estimation.

In an embodiment, the kernel function may comprise one of multivariate Gaussian kernel function, polynomial spline kernel function or exponential kernel function.

In an embodiment, the multivariate gaussian kernel function may be used as the kernel function, and a transformation matrix may be used in the multivariate gaussian kernel function and is optimized based on the labeled training data by modified neighborhood component analysis.

In an embodiment, the distance may comprise Kullback-Leibler divergence or Probability Product Kernel.

In an embodiment, the distance is the Kullback-Leibler divergence, and the Kullback-Leibler divergence may be approximated based on the strong law of large numbers.

In an embodiment, the calculated distance of the two distributions may be an input for and/or a result of an 3D object recognition system in a vehicle, for example an autonomous vehicle. The input and/or the result can be further processed in an onboard computer system of the vehicle. The input and/or the result can be further informed to a driver of the vehicle visually on a display and/or audible in a loudspeaker. In another embodiment, the calculated distance of the two distributions may be an input for and/or a result of an 3D object recognition system in a virtual camera apparatus having multiple lenses and video streams each providing one feature vector. The input and/or the result can be further informed to a user of the virtual camera apparatus on a display and/or audible in a loudspeaker. In another embodiment, the virtual camera apparatus can be implemented in the vehicle.

It is noted that any of the above embodiments can be combined in any combinations. It is noted that any of the components of the apparatus described above can be implemented as hardware or software modules. In the case of software modules, they can be embodied on a tangible computer-readable recordable storage medium. All of the software modules (or any subset thereof) can be on the same medium, or each can be on a different medium, for example. The software modules can run, for example, on a hardware processor. The method steps can then be carried out using the distinct software modules, as described above, executing on a hardware processor.

Additionally, an aspect of the disclosure can make use of software running on a general purpose computer or workstation. Such an implementation might employ, for example, a processor, a memory, and an input/output interface formed, for example, by a display and a keyboard. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. The processor, memory, and input/output interface such as display and keyboard can be interconnected, for example, via bus as part of a data processing unit. Suitable interconnections, for example via bus, can also be provided to a network interface, such as a network card, which can be provided to interface with a computer network, and to a media interface, such as a diskette or CD-ROM drive, which can be provided to interface with media.

Accordingly, computer software including instructions or code for performing the methodologies of the disclosure, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

As noted, aspects of the disclosure may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the disclosure may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server.

In comparison with existing approaches, the embodiments of the present disclosure have the following advantages: (1) the methods of the embodiments are built based on a nonparametric model and can avoid the model unfitting problem in conventional parametric approaches; and (2) the methods of the embodiments explore the label information in training data, and the discriminative ability of the distance measurement can be enhanced.

Some experiments are conducted to compare the proposed method with some existing distance estimation approaches for feature vector sets in 3D object classification. The datasets used in M. Wang, E Gao, K. Lu and E Rui, "*View-Based Discriminative Probabilistic Modeling for 3D Object Retrieval and Recognition*" *in IEEE Transactions on Image Processing*, vol. 22, no. 4, pp. 1395-1407, April 2013 are choosed, which is incorporated herein by reference in its entirety. In the above reference, GMM is utilized to model the distribution of each 3D object and then optimize the KL divergence between GMMs. The embodiments of the disclosure employ kernel density estimation such as multivariate Gaussian kernel function to model the distribution of each object and the kernel function used in the multivariate Gaussian kernel function is optimized based on labeled training data by modified neighborhood component analysis, and then calculate the KL divergence of the distributions. Three datasets used in the above reference, i.e., ETH, NTU and PSB are utilized. The number of training samples per class is set to 4. Detailed experimental settings can be found in the above reference. The comparison of the recognition rates is demonstrated in Table 1, wherein the approach in the above reference is denoted as "GMM-based approach". The superiority of our method is clear from Table 1.

TABLE 1

The comparison of the recognition rates obtained by GMM-based approach and the proposed method.

| | Method | |
| --- | --- | --- |
| Dataset | GMM-based approach | The proposed method |
| NTU | 0.962 | 0.974 |
| ETH | 0.78 | 0.823 |
| PSB | 0.704 | 0.77 |

The flowchart and block diagrams in the figures illustrate the architecture, functionality, and operation of possible implementations and combinations of apparatus, methods and computer program products according to various embodiments of the disclosure. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein, two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical region (both visible and invisible), as several non-limiting and non-exhaustive examples.

In any case, it should be understood that the components illustrated in this disclosure may be implemented in various forms of hardware, software, or combinations thereof, for example, application specific integrated circuit(s) (ASICS), functional circuitry, an appropriately programmed general purpose digital computer with associated memory, and the like. Given the teachings of the disclosure provided herein, one of ordinary skill in the related art will be able to contemplate other implementations of the components of the disclosure.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

What is claimed is:

1. An apparatus, comprising:
    at least one processor; and
    at least one memory including computer program code,
    the at least one memory and the computer program code configured to, with the at least one processor, cause the apparatus to perform at least the following:
    model distribution of two feature vector sets by a non-parametric model; and
    calculate distance of the two distributions,
    wherein a kernel function is used in the non-parametric model, the kernel function is optimized based on labeled training data, the first feature vector set comprises a plurality of feature vectors extracted from a sample, and the second feature vector set comprises a plurality of feature vectors extracted from another sample.

2. The apparatus according to claim 1, wherein the non-parametric model comprises kernel density estimation.

3. The apparatus according to claim 1, wherein the kernel function comprises one of multivariate Gaussian kernel function, polynomial spline kernel function or exponential kernel function.

4. The apparatus according to claim 1, wherein a multivariate Gaussian kernel function is used as the kernel function, and a transformation matrix is used in the multivariate Gaussian kernel function and is optimized based on the labeled training data by modified neighborhood component analysis.

5. The apparatus according to claim 1, wherein the distance comprises Kullback-Leibler divergence or Probability Product Kernel.

6. The apparatus according to claim 1, wherein the distance is a Kullback-Leibler divergence, and the Kullback-Leibler divergence is approximated based on a strong law of large numbers.

7. A method comprising:
    modeling distribution of two feature vector sets by a non-parametric model; and
    calculating distance of the two distributions,
    wherein a kernel function is used in the non-parametric model, the kernel function is optimized based on labeled training data, the first feature vector set comprises a plurality of feature vectors extracted from a sample, and the second feature vector set comprises a plurality of feature vectors extracted from another sample.

8. The method according to claim 7, wherein the non-parametric model comprises kernel density estimation.

9. The method according to claim 7, wherein the kernel function comprises one of multivariate Gaussian kernel function, polynomial spline kernel function or exponential kernel function.

10. The method according to claim 7, wherein a multivariate Gaussian kernel function is used as the kernel function, and a transformation matrix is used in the multivariate Gaussian kernel function and is optimized based on the labeled training data by modified neighborhood component analysis.

11. The method according to claim 7, wherein the distance comprises Kullback-Leibler divergence or Probability Product Kernel.

12. The method according to claim 7, wherein the distance is a Kullback-Leibler divergence, and the Kullback-Leibler divergence is approximated based on a strong law of large numbers.

13. A non-transitory computer readable medium having encoded thereon instructions to cause a processor to perform at least the following:
    modeling distribution of two feature vector sets by a non-parametric model; and
    calculating distance of the two distributions,
    wherein a kernel function is used in the non-parametric model, the kernel function is optimized based on labeled training data, the first feature vector set comprises a plurality of feature vectors extracted from a sample, and the second feature vector set comprises a plurality of feature vectors extracted from another sample.

14. The non-transitory computer readable medium according to claim 13, wherein the non-parametric model comprises kernel density estimation.

15. The non-transitory computer readable medium according to claim 13, wherein the kernel function comprises one of multivariate Gaussian kernel function, polynomial spline kernel function or exponential kernel function.

16. The non-transitory computer readable medium according to claim 13, wherein a multivariate Gaussian kernel function is used as the kernel function, and a transformation matrix is used in the multivariate Gaussian kernel function and is optimized based on the labeled training data by modified neighborhood component analysis.

17. The non-transitory computer readable medium according to claim 13, wherein the distance comprises Kullback-Leibler divergence or Probability Product Kernel.

18. The non-transitory computer readable medium according to claim 13, wherein the distance is a Kullback-Leibler divergence, and the Kullback-Leibler divergence is approximated based on a strong law of large numbers.

\* \* \* \* \*